(12) United States Patent
Lühmann et al.

(10) Patent No.: US 7,160,976 B2
(45) Date of Patent: *Jan. 9, 2007

(54) POLYURETHANE PSA

(75) Inventors: Bernd Lühmann, Norderstedt (DE);
Philippe Hesse, Buchholz (DE); Sianty Sunarto, Hamburg (DE); Uwe Schümann, Pinneberg (DE); Kirstin Weiland, Hamburg (DE); Carsten Böhmer, Pinneberg (DE)

(73) Assignee: tesa Aktiengesellschaft, Hamburg (DE)

( * ) Notice: Subject to any disclaimer, the term of this patent is extended or adjusted under 35 U.S.C. 154(b) by 10 days.

This patent is subject to a terminal disclaimer.

(21) Appl. No.: 10/816,277

(22) Filed: Apr. 1, 2004

(65) Prior Publication Data

US 2005/0019587 A1 Jan. 27, 2005

(30) Foreign Application Priority Data

Apr. 16, 2003 (DE) .................. 103 17 789

(51) Int. Cl.
*C08G 18/48* (2006.01)

(52) U.S. Cl. ............. 528/77; 528/76; 428/423.1; 156/331.4

(58) Field of Classification Search ............ 528/76, 528/77; 428/423.1; 156/331.4
See application file for complete search history.

(56) References Cited

U.S. PATENT DOCUMENTS

| | | | |
|---|---|---|---|
| 3,246,049 A | 4/1966 | Webber ............. | 260/829 |
| 3,437,622 A | 4/1969 | Dahl ............... | 260/24 |
| 3,515,773 A | 6/1970 | Dahl ............... | 260/859 |
| 3,681,277 A | 8/1972 | Scholz et al. ...... | 260/24 |
| 3,718,712 A | 2/1973 | Tushaus ........... | 260/858 |
| 3,743,616 A | 7/1973 | Kest ............... | 260/27 |
| 3,761,307 A | 9/1973 | Dahl ............... | 117/122 |
| 3,796,678 A | 3/1974 | Bartizal ........... | 260/29.2 |
| 3,879,248 A | 4/1975 | Kest ............... | 156/289 |
| 3,925,283 A | 12/1975 | Dahl ............... | 260/24 |
| 3,930,102 A | 12/1975 | Muller et al. ...... | 428/354 |
| 4,087,392 A | 5/1978 | Hartmann et al. ... | 260/24 |
| 4,626,475 A | 12/1986 | Goel et al. ........ | 428/423.1 |
| 4,661,542 A | 4/1987 | Gilch et al. ....... | 524/59 |
| 4,855,077 A | 8/1989 | Shikinami et al. ... | 252/518 |
| 5,102,714 A | 4/1992 | Mobley et al. ..... | 428/95 |
| 5,157,101 A | 10/1992 | Orr ................ | 528/74.5 |
| 5,227,409 A | 7/1993 | Mobley et al. ..... | 521/167 |
| 5,486,570 A | 1/1996 | St. Clair .......... | 525/123 |
| 5,591,820 A | 1/1997 | Kydonieus et al. .. | 528/76 |
| 5,693,584 A | 12/1997 | Le-Khac ........... | 502/159 |
| 5,712,216 A | 1/1998 | Le-Khac et al. .... | 502/175 |
| 5,714,543 A | 2/1998 | Shah et al. ........ | 525/123 |
| 5,844,013 A | 12/1998 | Kenndoff et al. ... | 521/137 |
| 5,910,536 A | 6/1999 | Kydonieus et al. .. | 524/590 |
| 5,952,261 A | 9/1999 | Combs ............. | 502/175 |
| 6,040,028 A | 3/2000 | Cline et al. ....... | 428/41.8 |
| 2003/0059607 A1* | 3/2003 | Schumann et al. ... | 428/355 N |
| 2005/0019560 A1* | 1/2005 | Hesse et al. ....... | 428/355 N |

FOREIGN PATENT DOCUMENTS

| | | |
|---|---|---|
| DE | 19 04 102 A | 8/1970 |
| DE | 21 39 640 A | 2/1973 |
| DE | 24 35 217 A | 2/1975 |
| DE | 24 35 218 A | 2/1975 |
| DE | 2438948 | 2/1976 |
| DE | 42 33 289 A | 4/1994 |
| DE | 100 30 908 A1 | 2/2001 |
| DE | 10259248 A1 | 7/2003 |
| EP | 0 081 103 A1 | 6/1983 |
| EP | 0 196 749 A1 | 10/1986 |
| EP | 0 597 636 A1 | 5/1994 |
| EP | 0 882 749 A1 | 12/1998 |
| EP | 0 979 835 A | 2/2000 |
| EP | 1 088 871 A1 | 4/2001 |
| EP | 1 095 993 A1 | 5/2001 |
| EP | 1 101 803 A1 | 5/2001 |
| EP | 1 108 768 A1 | 6/2001 |
| EP | 1 285 955 | 2/2003 |
| GB | 1113925 A | 5/1968 |
| GB | 1216672 A | 12/1970 |

(Continued)

OTHER PUBLICATIONS

Gaechter and Müller, *Taschenbuch der Kunststoff-Additive*, Munich, 1979, p. 133-281.
Kirk-Othmer, *Encyclopedia of Chemical Technology* (3), vol. 23, 615 to 627, John Wiley & Sons, New York (1983).

(Continued)

*Primary Examiner*—Rachel Gorr
(74) *Attorney, Agent, or Firm*—Norris McLaughlin & Marcus PA

(57) ABSTRACT

Pressure-sensitive adhesive based on polyurethane, characterized in that the polyurethane is composed of the following starting materials which are reacted with one another in the stated proportions:
a) at least one aliphatic or alicyclic diisocyanate having in each case an asymmetrical molecular structure,
b) a combination of at least one polypropylene glycol diol and at least one polypropylene glycol triol,
  the ratio of the number of hydroxyl groups in the diol component to the number of hydroxyl groups in the triol component being between 0.7 and 9.0, preferably between 1.5 and 2.5,
additionally the ratio of the number of isocyanate groups to the total number of hydroxyl groups being between 0.9 and 1.1, preferably between 0.95 and 1.05, and the diols and triols alternatively being selected and combined in each case as follows:
  diols having a molecular weight of less than or equal to 1000 are combined with triols whose molecular weight is greater than 1000, preferably greater than or equal to 3000,
  diols having a molecular weight of greater than 1000 are combined with triols whose molecular weight is less than 1000.

12 Claims, No Drawings

FOREIGN PATENT DOCUMENTS

| | | |
|---|---|---|
| GB | 1 425 500 | 2/1976 |
| JP | 59 227 922 | 12/1984 |
| JP | 59 230 076 | 12/1984 |
| JP | 63 189 486 | 8/1988 |
| JP | 63 260 977 | 10/1988 |
| JP | 01 156 386 | 6/1989 |
| JP | 01174581 A | 11/1989 |
| JP | 02 003 476 | 1/1990 |
| JP | 2000 073 040 | 3/2000 |
| JP | 2000 256 638 | 9/2000 |
| JP | 2000 256 639 | 9/2000 |
| JP | 2000 328 034 | 11/2000 |
| JP | 2001 146 577 | 5/2001 |
| WO | WO 94/07935 A | 4/1994 |
| WO | WO 97/22642 A1 | 6/1997 |
| WO | WO 98/30648 A1 | 7/1998 |
| WO | WO 98/31760 A1 | 7/1998 |
| WO | WO 99/51657 A1 | 10/1999 |
| WO | WO 99/51661 A1 | 10/1999 |
| WO | WO 99/56874 A1 | 11/1999 |
| WO | WO 99/59719 A1 | 11/1999 |
| WO | WO 99/64152 A1 | 12/1999 |
| WO | WO 99/64493 A1 | 12/1999 |
| WO | WO 01/62818 A1 | 8/2001 |

OTHER PUBLICATIONS

*Encyclopedia of Polymer Science and Technology*, vol. 14, 125 to 148, John Wiley & Sons, New York (1971).

Ullmann, *Encyklopadie der Technischen Chemie* (4), Band 8, p. 21; Band 15; p. 254ff, 676ff, Verlag Chemie GmbH, Weinheim/Bergstrasse (1974).

* cited by examiner

POLYURETHANE PSA

The invention relates to a pressure-sensitive adhesive (PSA) based on a chemically crosslinked polyurethane that allows paper, paperboard or other lightweight articles of everyday use to be bonded reliably to themselves or to other substrates and to be detached again without residue, very largely without damaging the paper, paperboard, articles or substrates during detachment or without leaving greasy-looking spots, which PSA, in particular, can be used more than once, is washable and is stable to light, and relates to a reactive coating process for its solvent-free and water-free, continuous preparation, and also relates to the use of the PSA for producing self-adhesive articles, such as adhesive tapes, strips, sheets or pads, for example.

BACKGROUND OF THE INVENTION

Pressure-sensitive adhesion properties or intrinsic adhesion properties are not typical of polyurethanes. Although polyurethanes occupy position five in the list of plastics in terms of the amounts produced, PSAs of this material play only a very minor role economically.

Nevertheless, polyurethane PSAs have been known for a long time and are described diversely.

The effect of pressure-sensitive adhesiveness can be obtained by adding tackifier resins and/or plasticizers to the polyurethane base polymer. This method is described in, for example, U.S. Pat. No. 3,437,622 A (Dahl et al., Continental Tapes), U.S. Pat. No. 3,718,712 A (Tushaus et al., 3M), U.S. Pat. No. 4,087,392 A (Hartmann et al., BASF), DE 19 04 102 A (Hagenweiler, BASF) and JP 2000 256 639 (Toyo).

PSAs of this kind generally have the drawback of exhibiting strong peel increase with many substrates, such as paper or paperboard, for example, when bonded for a prolonged period, and accordingly cannot be detached again without damage.

The term "peel increase" is understood by a person skilled in the art to describe the increase in bond strength of the adhesive bond during storage.

It is also possible for the tackifier resin to migrate into the substrate, where it leaves greasy-looking spots.

The highly disruptive phenomenon of the PSA, following its redetchment from paper, paperbord, wallpaper or similar materials, leaving behind "grease spots" is observed not least for those polyurethane-based PSAs where the pressure-sensitive adhesiveness is obtained by undercrosslinking: i.e. an amount of isocyanate groups in deficit to the isocyanate-reactive groups, such as hydroxyl or amino groups, for example.

PSAs designed on the principle of undercrosslinking are described in, for example, U.S. Pat. No. 5,157,101 A (Orr, Norwood), DE 24 35 218 A (Adsley et al., Adhesive Tapes), JP 59 227 922 (Sanyo), U.S. Pat. No. 3,930,102 A (Szonn et al., Beiersdorf), U.S. Pat. No. 5,714,543 A (Kydonieus et al., Bristol Myers Squibb), EP 0 597 636 A1 (Kydonieus et al., Squibb) and U.S. Pat. No. 5,591,820 A (Kydonieus et al., Squibb).

Polyurethane PSAs containing monools fall into a very similar category with analogous weaknesses. Polyurethanes of this kind are likewise undercrosslinked and therefore contain relatively large fractions of migratable polyurethane units of low molecular weight. Polyurethane PSAs on this basis are known from, for example, EP 0 882 749 A1 (Ikeda et al., Nitto), U.S. Pat. No. 5,227,409 A (Mobley et al., Dow) and U.S. Pat. No. 5,102,714 A (Mobley et al., Dow).

Another type of polyurethane PSAs uses polyol components which carry hydroxyl groups and contain double bonds. Polyurethane PSAs on this basis are set out in, for example, JP 02 003 476 (Tsubota et al., Shinko), WO 98/30648 A1 (Gerard et al., Shell), JP 59 230 076 (Sekisui), JP 2001 146 577 (Toyo), U.S. Pat. No. 3,879,248 A (Kest), U.S. Pat. No. 3,743,616 A (Kest), U.S. Pat. No. 3,743,617 A (Kest), U.S. Pat. No. 5,486,570 A (St. Clair, Shell) and U.S. Pat. No. 3,515,773 A (Dahl et al., Continental Tapes). A drawback is the oxidative sensitivity of these PSAs, caused by the double bonds in the polymer main chain. After a certain time this leads to filming or to "blunting" of the pressure-sensitively adhesive surface. In addition, the majority of PSAs of this type further contain resins, with the disadvantages already described earlier on above.

A special polyurethane PSA containing carbon-carbon double bonds and based on castor oil, a natural product, is described in U.S. Pat. No. 3,246,049 A (Webber, Norton). Here again, the oxidative sensitivity is to be regarded as a weakness.

EP 0 979 835 A (Questel et al., Elf Atochem) proposes hydroxyl-terminated polyalkylenes as a polyol component, which would solve the problem of oxidative activity. The compositions, however, are moisture-curing, consequently attain a high ultimate cohesive strength and cannot be used more than once, so that they are unsuitable for reversible adhesive bonding paper. They further contain tackifier resins and plasticizers, whose disadvantages have already been described earlier on above.

Moisture-curing polyurethane PSAs are also described in, for example, U.S. Pat. No. 4,661,542 A (USM), JP 63 189 486 (Sanyo) and EP 0 196 749 A1 (von Voithenberg et al., Emhart).

A polyurethane PSA based on hydrogenated polybutadienes is described in JP 01 156 386 (Uehara et al., Hitachi). A drawback there is the need for electron beam crosslinking, which involves a considerable level of technical complexity.

A polyurethane PSA likewise requiring electron beam curing is known from JP 63 260 977 (Uehara et al., Hitachi). It uses polyethers as polyol component.

Certain publications describe polyurethane-including blends or polyurethane copolymers having pressure-sensitive adhesive properties. Examples include U.S. Pat. No. 5,910,536 A (Kydonieus et al., Bristol Myers Squibb), U.S. Pat. No. 5,714,543 A (Shah et al., Bristol Myers Squibb) and U.S. Pat. No. 4,626,475 A (Barnett et al., Ashland Oil). These PSAs generally feature a heightened tack and are therefore difficult to remove from paper and other sensitive substrates without damaging them.

Polyurethane PSAs having special additional properties, such as flame retardancy or electrical conductivity, for example, are described in, for example, EP 1 108 768 A1 (Wong, Tyco) or U.S. Pat. No. 4,855,077 A (Hata et al., Takiron).

Foamed polyurethanes having pressure-sensitive adhesion properties are likewise known. An example that may be mentioned is the publication DE 24 35 217 A (Adsley et al., Adhesive Tapes), and also the descriptions of hydrophilic foams in DE 42 33 289 A (Kenndoff et al., Beiersdorf) and WO 94/07935 A (Kenndoff et al., Beiersdorf).

In principle, as a result of the enlargement of the surface area, foamed polyurethanes have the drawback of a heightened oxidative sensitivity and also a heightened light sensitivity. In practice it has been found that they exhibit strong peel increase on paper and paperboard when bonded for a prolonged period and either cannot be removed without damaging the paper or paperboard or else, particularly in the case of foams made hydrophilic by additions of superabsorbent, interact with the paper or paperboard in such a way that spotting occurs.

Polyurethanes having pressure-sensitive adhesive properties can also be obtained, as demonstrated in JP 2000 073 040 (Toyo) and JP 2000 256 638 (Toyo), by using not only polyethers but also polyesters and also two different catalysts within a polyol component formula. A particular drawback in this case is the increased preparation complexity resulting from the formulas.

JP 2000 328 034 (Toyo), U.S. Pat. No. 3,761,307 A (Dahl) and U.S. Pat. No. 3,925,283 A (Dahl, Continental Tapes) describe pressure-sensitive adhesive polyurethane/ureas which are obtained by incorporating additional amine-type chain extenders or crosslinkers into the polymer. Drawbacks perceived are the complexity in preparation and the presumed excessive peel increase on paper.

DE 21 39 640 A (Dollhausen et al., Bayer) describes a PSA based on an aromatic diisocyanatourethane. A particular drawback is the yellowing tendency, which is typical of aromatic polyurethanes.

In order to achieve pressure-sensitive adhesion properties DE 100 30 908 A1 (Bolte et al., Henkel) and EP 0 081 103 A1 (Miyake et al., Takeda) propose using two different isocyanates within a polyurethane composition. In these cases too the complexity in preparation is perceived to be a drawback.

WO 97/22642 A1 (Chang et al., Bristol Myers Squibb) proposes, for the preparation of a PSA, heating an NCO-terminated prepolymer and a polyhydroxy compound together at a certain temperature until a gel fraction of 30 to 40% is obtained. A disadvantage of this method is the grease strikethrough tendency when the PSA is used to bond paper, this tendency being a result of the relatively low gel content.

U.S. Pat. No. 3,796,678 A (Bartizal, 3M) discloses a polyurethane PSA based on capped isocyanate prepolymers which relies on water or organic solvents for its preparation. The complex nature of the preparation is regarded as a drawback, along with the unavoidable need to use water or solvents.

A polyurethane latex PSA is described in WO 98/31760 A1 (Schrock et al., Dow Chemical). A drawback is the need for drying, which makes it either impossible or at least very time-consuming to obtain blister-free, relatively thick PSA films.

Certain publications define a polyurethane PSA by way of the crosslinking density. GB 1,113,925 A (Weller) and GB 1,216,672 A (Grindley) propose chain lengths of from 130 to 285 chain atoms and, respectively, more than 285 chain atoms between the crosslinking points. In practice it has been shown that controlling the PSA properties by way of the criterion of chain length alone is an impossibility. An insufficient crosslinking density results in the known problem of grease strikethrough in the case of adhesive bonds on paper, while too high a crosslinking density leads to PSAs whose intrinsic adhesiveness is inadequate.

EP 1 088 871 A1 (Heguri et al., Sekisui) prescribes a certain distance between the isocyanate groups, or a certain degree of crosslinking, for the polyisocyanate used. The molecular weight between two isocyanate groups in the polyisocyanate is intended to amount to from 220 to 570. This way of controlling the crosslinking density by way of the chain length within the polyisocyanate is likewise unlikely to mitigate the known problem either that the bond strength is inadequate, particularly for bonds on paper, or otherwise that a tendency is observed for grease spots to be formed.

U.S. Pat. No. 6,040,028 A (Cline et al., Bayer) also defines a polyurethane adhesive (contact adhesive) by way of the molecular weight between crosslinking points. A molecular weight of between 7000 and 16000 is prescribed. Further restrictions are imposed, to the effect, inter alia, that from 0 to 10% of the polyols must have a molecular weight of from 60 to 400 and from 90 to 100% of the polyols must have a molecular weight of from 1800 to 12000.

Here again it must be assumed that the grease strikethrough tendency typical of PSA polyurethanes will occur, since the crosslinking density is relatively low and no indications are given of a possible solution to the problem.

WO 01/62818 A1 (Hansen et al., 3M) proposes reacting isocyanates with two polyols or other materials which react with NCO groups for the purpose of preparing a polyurethane PSA, the components which react with the isocyanates differing from one another in that one has a molecular weight of more than 2000 and one has a molecular weight of less than 2000.

PSAs of this kind are known, inter alia, from the examples in U.S. Pat. No. 5,227,409 A and U.S. Pat. No. 3,437,622 A, which also includes the restriction (according to dependant claim 5) whereby the components which react with the isocyanates are almost exclusively diols. Additionally, polyurethanes with such a composition have already been described in the examples in EP 1 095 993 A1 and EP 1 101 803 A1, the last-mentioned examples not relating to compositions for obtaining PSAs. The proposed reaction product in WO 01/62818 A1 is therefore not definitely a PSA. There are no references to solving the grease strikethrough problem.

It is an object of the invention to provide a pressure-sensitive adhesive with which paper, paperboard or other lightweight articles of everyday use can be bonded reliably to themselves or other substrates and can be detached again without residue without the paper, paperboard, articles or substrates being damaged during detachment, which can be used more than once, is washable and is stable to light, and which does not have the outlined disadvantages of the prior art, or not to the same extent. In particular the PSA, following removal, ought not to leave any greasy-looking spots on the paper, paperboard, articles or substrate.

SUMMARY OF THE INVENTION

The invention accordingly provides a pressure-sensitive adhesive based on polyurethane, characterized in that the polyurethane is composed of the following starting materials which are reacted with one another in the stated proportions:
  a) at least one aliphatic or alicyclic diisocyanate having in each case an asymmetrical molecular structure,
  b) a combination of at least one polypropylene glycol diol and at least one polypropylene glycol triol,
    the ratio of the number of hydroxyl groups in the diol component to the number of hydroxyl groups in the triol component being between 0.7 and 9.0, preferably between 1.5 and 2.5,
    additionally the ratio of the number of isocyanate groups to the total number of hydroxyl groups being between 0.9 and 1.1, preferably between 0.95 and 1.05, and the diols and triols alternatively being selected and combined in each case as follows:
      diols having a molecular weight of less than or equal to 1000 are combined with triols whose molecular weight is greater than 1000, preferably greater than or equal to 3000, diols having a molecular weight of greater than 1000 are combined with triols whose molecular weight is less than 1000.

DETAILED DESCRIPTION

In order to produce polyurethanes having sufficient light stability it is necessary, as is known, to use aliphatic or alicyclic isocyanates or isocyanates containing isocyanate groups which are not attached aromatically. Surprisingly it has been found that aliphatic or alicyclic diisocyanates having in each case an asymmetrical molecular structure, in which, in other words, the two isocyanate groups each possess a different reactivity, are suitable for producing polyurethanes having the desired profile of properties in accordance with the object of the invention. In particular, the tendency otherwise typical of pressure-sensitively adhesive polyurethanes, namely that of leaving greasy-looking spots on paper or paperboard, is markedly reduced through the use of diisocyanates having an asymmetrical molecular structure. By asymmetrical molecular structure is meant the absence from the molecule of elements of symmetry (for example mirror planes, axes of symmetry, centres of symmetry); in other words, the impossibility of performing any symmetry operation that produces a molecule congruent with the starting molecule.

Examples of suitable diisocyanates in accordance with the invention are 1-isocyanatomethyl-3-isocyanato-1,5,5-trimethylcyclohexane (isophorone diisocyanate), 1-methyl-2,4-diisocyanatocyclohexane, 1,6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-isocyanato-1-(4-isocyanatobut-1-yl)-1,3,3-trimethylcyclohexane, 1-isocyanato-2-(3-isocyanatoprop-1-yl)cyclohexane, 1-isocyanato-2-(2-isocyanatoeth-1-yl)cyclohexane, dicyclohexylmethane 2,4'-diisocyanate, 2-heptyl-3,4-bis(9-isocyanatononyl)-1-pentylcyclohexane, ethylethylene diisocyanate, 2,2,4-trimethylhexamethylene diisocyanate or chlorinated, brominated, sulphur-containing or phosphorus-containing diisocyanates having an asymmetrical molecular structure.

In one preferred embodiment isophorone diisocyanate is used.

With regard to the substantive and quantitative composition of the starting materials reacted with the diisocyanate it has surprisingly been found that combinations of at least one polypropylene glycol diol with at least one polypropylene glycol triol are suitable for producing polyurethanes having the desired profile of properties in accordance with the object of the invention, if the ratio of the number of hydroxyl groups of the diol to the number of hydroxyl groups of the triol is between 0.7 and 9.0, preferably between 1.5 and 2.5, if, additionally, the ratio of the number of isocyanate groups to the total number of hydroxyl groups is between 0.9 and 1.1, preferably between 0.95 and 1.05, if, in other words, there is neither a significant isocyanate excess nor a significant isocyanate deficit, and if the diols and triols are alternatively selected and combined in each case as follows:

diols having a molecular weight of less than or equal to 1000 are combined with triols whose molecular weight is greater than 1000, preferably greater than or equal to 3000, diols having a molecular weight of greater than 1000 are combined with triols whose molecular weight is less than 1000.

As polypropylene glycols it is possible to use all commercial polyethers based on propylene oxide and a starter which is difunctional in the case of the diols and trifunctional in the case of the triols. Included here are not only the polypropylene glycols prepared conventionally—that is, generally by using a basic catalyst, such as potassium hydroxide, for example—but also the particularly pure polypropylene glycols prepared by DMC (double metal cyanide) catalysis, whose preparation is described in, for example, U.S. Pat. No. 5,712,216 A, U.S. Pat. No. 5,693,584 A, WO 99/56874 A1, WO 99/51661 A1, WO 99/59719 A1 WO 99/64152 A1, U.S. Pat. No. 5,952,261 A, WO 99/64493 A1 and WO 99/51657 A1.

A characteristic of the DMC-catalysed polypropylene glycols is that the "nominal" or theoretical functionality of precisely 2 in the case of the diols or precisely 3 in the case of the triols is also actually achieved approximately.

In the case of conventionally prepared polypropylene glycols the "true" functionality is always somewhat lower then the theoretical functionality, particularly in the case of polypropylene glycols having a relatively high molecular weight. The reason for this is a secondary reaction of rearrangement of the propylene oxide to form allyl alcohol.

Furthermore, it is also possible to use all polypropylene glycol diols or triols containing copolymerized ethylene oxide, which is the case in many commercial polypropylene glycols, in order to obtain an increased reactivity towards isocyanates.

By varying the ratio of the number of hydroxyl groups in the diol to that in the triol within the stated boundaries it is possible to adjust the bond strength in accordance with the application. Surprisingly it has been found that the higher the ratio of the number of diol OH groups to the number of triol OH groups, the greater the bond strength.

The bond strength range which can be adjusted within the stated boundaries is approximately between 1.0 and 7.0 N/cm, within the preferred boundaries between approximately 1.5 and 4.0 N/cm.

The bond strength can in each case by controlled or adjusted by way of the ratio of the number of hydroxyl groups in the diol to the number of hydroxyl groups in the triol.

In one possible embodiment the polyurethane-based PSA includes further formulating ingredients, such as, for example, catalysts, ageing inhibitors (antioxidants), light stabilizers, UV absorbers, rheological additives, and other auxiliaries and additives.

When selecting these substances it should be ensured that they do not have any tendency to migrate to the substrate to be bonded, so that no spots are formed in this way. For the same reason the concentration of these substances, particularly of the liquid substances, in the composition as a whole is to be minimized. The additional use of plasticizers or tackifier resins should be avoided.

In order to accelerate the reaction between the isocyanate component and the component which reacts with the isocyanate it is possible to use any of the catalysts known to the person skilled in the art, such as tertiary amines or organotin compounds, for example.

The use of antioxidants, though advantageous, is not mandatory.

Suitable antioxidants include, for example, sterically hindered phenols, hydroquinone derivatives, amines, organic sulphur compounds or organic phosphorus compounds.

Light stabilizers and UV absorbers can optionally also be used.

Light stabilizers used are those disclosed in Gaechter and Müller, Taschenbuch der Kunststoff-Additive, Munich, 1979, in Kirk-Othmer (3.) 23, 615 to 627, in Encycl. Polym. Sci. Technol 14, 125 to 148 and in Ullmann (4.) 8, 21; 15, 259, 676.

Examples of rheological additives are pyrogenic silicas, phyllosilicates (bentonites), high molecular mass polyamide powders or castor oil derivative powders.

In one preferred embodiment the pressure-sensitive adhesive is prepared continuously in accordance with the process described below:

A vessel A is charged substantially with the premixed polypropylene glycol combination (polyol component) and a vessel B is charged substantially with the isocyanate component, it being possible for the further formulating ingredients to have been mixed into these components beforehand in a standard mixing procedure.

The polyol component and the isocyanate component are conveyed via precision pumps through the mixing head or mixing tube of a multi-component mixing and metering unit, where they are homogeneously mixed and consequently reacted. The chemically inter-reactive components mixed in this way are applied immediately thereafter to a web-form backing material which is preferably moving at a constant speed. The nature of the backing material depends on the article to be produced. The backing material coated with the reactive polyurethane composition is passed through a heating tunnel, in which the polyurethane composition cures to the pressure-sensitive adhesive. The coatweight of the polyurethane composition is freely selectable. It depends on the article to be produced. Finally the coated backing material is wound up in a winding station.

The process described allows solvent-free and water-free operation. Solvent-free and water-free operation is the preferred procedure, but is not mandatory. In order, for example, to obtain particularly low coatweights, the components can be diluted appropriately.

In order to enhance the anchorage of the polyurethane composition on the web-form backing materials it is possible to use any known method of surface pretreatment, such as, for example, corona pretreatment, flaming, gas-phase treatment (fluorination, for example). It is likewise possible to use any known method of priming, in which case the primer layer can be applied both from solution or dispersion to the backing material and in an extrusion or coextrusion process.

In order to improve the unwind properties of the wound roll it is possible to precoat the reverse of the web-form material with a release coating material or for the reverse to carry a coextruded or extruded-on release coating.

A polyurethane-based pressure-sensitive adhesive as described above, characterized in that the polyurethane is composed of the following starting materials which are reacted with one another in the stated proportions:

a) at least one aliphatic or alicyclic diisocyanate having in each case an asymmetrical molecular structure,
b) a combination of at least one polypropylene glycol diol and at least one polypropylene glycol triol,
  the ratio of the number of hydroxyl groups in the diol component to the number of hydroxyl groups in the trio component being between 0.7 and 9.0, preferably between 1.5 and 2.5,
  additionally the ratio of the number of isocyanate groups to the total number of hydroxyl groups being between 0.9 and 1.1, preferably between 0.95 and 1.05, and the diols and triols alternatively being selected and combined in each case as follows:
  diols having a molecular weight of less than or equal to 1000 are combined with triols whose molecular weight is greater than 1000, preferably greater than or equal to 3000,
  diols having a molecular weight of greater than 1000 are combined with triols whose molecular weight is less than 1000, exhibits outstanding product properties which even the person skilled in the art could not have foreseen in such a way.

The pressure-sensitive adhesive is suitable for fixing, for example, notes, sheets of paper, calendar pages, strips, cards or boxes or made of paperboard, cardboard or plastic, or other small utility articles made of plastic, wood, glass, stone or metal, reliably to numerous substrates or to themselves.

The pressure-sensitive adhesive as described above can be detached again without problems at any time, even after weeks or months, from the articles, materials or substrates to which it has been adhered without damage to these articles, materials or substrates. In particular, following detachment, the pressure-sensitive adhesive does not leave behind any residues or greasy-looking spots on the bonded articles, materials or substrates, not even on highly absorbent paper.

The pressure-sensitive adhesive as described above can be used more than once without impairment in its bond strength. If the PSA is stored in the unbonded state in a normal environment for a relatively long period without a protective covering, it then naturally becomes dusty, and its bond strength is thus reduced as a result. Such a layer of dust can easily be removed again at any time using normal mains water. After drying, the original bond strength is immediately reestablished in full. Even large quantities of dust, sand or powders of any grain size can easily be removed again by washing.

By virtue of the fact that the PSA is stable to light it can also be used for adhesive bonding on articles, materials or substrates which are exposed to light and the sun, for example on or behind windowpanes or car windows. In general, the PSA is equally suitable for both interior and exterior applications.

The intention of the text below is to illustrate the invention with reference to examples, though without wishing thereby to limit it.

The following test methods were used concisely to characterize the specimens produced in accordance with the processes described.

The test specimens were each produced by coating the initially liquid, reactive polyurethane PSA at a coatweight of 50 g/m$^2$ onto a 26 μm polyester film and curing it at 100° C. The measurements were made after an "ageing period" (at room temperature) of one week.

The bond strength was determined in accordance with PSTC-101 (peel adhesion). In accordance with this method the assembly of PSA layer and polyester film is applied to the substrate (steel) and then peeled off under defined conditions by means of a tensile testing machine. The peel angle is in each case 180° and the peel rate 300 mm/min. The force required for peeling is the bond strength, which is reported in the unit N/cm.

The shear test was carried out in accordance with test specification PSTC-107. According to this method the assembly of PSA layer and polyester film is applied to the substrate (steel) and subsequently subjected to a constant shear load. The holding time is measured, in minutes. The bond area was in each case 13×20 mm. The shear load on this bond area was in each case 1 kg.

The tack measurement (measurement of the surface stickiness) was carried out by the rolling ball method in accordance with test specification PSTC-6. The measuring apparatus is accordingly composed essentially of an inclined plane, a steel ball and a defined stainless steel substrate. The 5.6 g steel ball (11 mm in diameter) rolls down the inclined plane (height: 65 mm) at an angle of inclination of 21.5° onto the PSA, which brakes the ball by virtue of its pressure-sensitive adhesiveness. The distance run by the ball on the PSA surface is taken as a measure of the tack. Accordingly, the tack is inversely proportional to the distance travelled.

The testing of light stability was carried out using a "sunlight lamp" from Osram with the designation ULTRA-VITALUX®, power input 300 W. The samples were uninterruptedly irradiated, unprotected, from a distance of 50 cm. The temperature at the location of the sample was in each case approximately 60° C. Assessments were made of the colour change of the PSA and also of the change in bond strength, in each case after a period of irradiation of one week and of two weeks. This corresponds approximately in each case to a 10-fold uninterrupted real summer sun exposure in central Europe.

EXAMPLES

Coating in the examples was carried out on a standard laboratory coating unit for continuous coating. The sheet width was 50 cm. The coating slot width was variably adjusted between 0 and 1 cm. The length of the heating tunnel was about 12 m. The temperature in the heating tunnel was divisible into four zones each freely selectable between room temperature and 120° C.

A standard multi-component mixing and metering unit with a dynamic mixing system was used. The mixing head was designed for two liquid components. The mixing rotor had a variable speed of up to approximately 5000 rpm max. The metering pumps of this unit were gear pumps having an output of approximately 2 l/min max.

The polyol components were prepared in a standard heatable and evaluable mixing tank. During the mixing operation, which took about two hours in each case, the temperature of the mixture was set at about 70° C. and a vacuum was applied in order to degas the components.

Table 1 lists the base materials used to prepare the polyurethane PSAs, in each case with their tradenames and manufacturers. The raw materials cited are all freely available commercially.

TABLE 1

Base materials used to prepare the polyurethane PSAs, with tradenames and manufacturers

| Tradename | Chemical basis Average molar mass OH or NCO number | Manufacturer/ Supplier |
|---|---|---|
| Voranol P 400 ® | polypropylene glycol, diol (M = 400) (4643 mmol OH/kg) | Dow |
| Desmophen 1262 BD ® | polypropylene glycol, diol (M = 430) (4661 mmol OH/kg) | Bayer |
| Desmophen 1112 BD ® | polypropylene glycol, diol (M = 1000) (1977 mmol OH/kg) | Bayer |
| Acclaim 2220 N ® | polypropylene glycol, diol, high-purity, prepared by DMC catalysis (M = 2250) (891 mmol OH/kg) | Bayer |

TABLE 1-continued

Base materials used to prepare the polyurethane PSAs, with tradenames and manufacturers

| Tradename | Chemical basis Average molar mass OH or NCO number | Manufacturer/ Supplier |
|---|---|---|
| Acclaim 4220 N ® | polypropylene glycol, diol, high-purity, prepared by DMC catalysis (M = 4000) (500 mmol OH/kg) | Bayer |
| Desmophen 1380 BT ® | polypropylene glycol, triol (M = 450) (6774 mmol OH/kg) | Bayer |
| Desmophen 3061 BT ® | polypropylene glycol, triol (M = 3000) (1000 mmol OH/kg) | Bayer |
| Desmophen 5035 BT ® | polypropylene glycol, triol (M = 4800) (624 mmol OH/kg) | Bayer |
| Voranol CP 4755 ® | polypropylene glycol, triol (M = 4700) (616 mmol OH/kg) | Dow |
| Desmophen 5031 BT ® | polypropylene glycol, triol (M = 6000) (502 mmol OH/kg) | Bayer |
| Voranol CP 6055 ® | polypropylene glycol, triol (M = 6000) (491 mmol OH/kg) | Dow |
| Vestanat IPDI ® | isophorone diisocyanate (M = 222.3) (8998 mmol NCO/kg) | Degussa-Hüls |
| Vestanat TMDI ® | 2,2,4-trimethyl-hexamethylene diisocyanate (M = 210.3) (9500 mmol NCO/kg) | Degussa-Hüls |
| Mark DBTL ® | dibutyltin dilaurate | Nordmann, Rassmann |
| Tinuvin 292 ® | sterically hindered amine, light stabilizer | Ciba |
| Tinuvin 400 ® | triazine derivative, UV stabilizer | Ciba |
| Aerosil R202 ® | hydrophobicized pyrogenic silica | Degussa-Hüls |

Example 1

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Voranol P 400 ® | 12.0 | 55.8 mmol OH |
| Voranol CP 6055 ® | 75.7 | 37.1 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 10.3 | 92.9 mmol NCO |

The test specimens (50 g/m² polyurethane PSA on 26 μm polyester film; see above) achieved a bond strength on steel of 3.0 N/cm. In the shear test a holding time of 2000 minutes was attained. The distance run by the ball in the Rolling Ball Test was 58 mm. After two weeks of irradiation with the sunlight lamp there were no changes, either in colour or in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 2

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Voranol P 400 ® | 12.2 | 56.8 mmol OH |
| Voranol CP 6055 ® | 77.2 | 37.9 mmol OH |
| Mark DBTL ® | 0.1 | |
| B component | | |
| Vestanat IPDI ® | 10.5 | 94.7 mmol NCO |

The test specimens (50 g/m² polyurethane PSA on 26 μm polyester film; see above) achieved a bond strength on steel of 3.0 N/cm. In the shear test a holding time of 2000 minutes was attained. The distance run by the ball in the Rolling Ball Test was 62 mm. After one week of irradiation with the sunlight lamp there were no changes, neither in colour nor in bond strength. After two weeks of irradiation there were no changes in colour, but the PSA was perceptibly softer. The inherent tack had increased. The bond strength was now 9.0 N/cm. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 3

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Voranol P 400 ® | 17.8 | 82.5 mmol OH |
| Voranol CP 6055 ® | 67.3 | 33.1 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 12.9 | 115.6 mmol NCO |

The test specimens (50 g/m² polyurethane PSA on 26 μm polyester film; see above) achieved a bond strength on steel of 4.0 N/cm. In the shear test a holding time of 150 minutes was attained. The distance run by the ball in the Rolling Ball Test was 15 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 4

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Voranol P 400 ® | 24.4 | 113.5 mmol OH |
| Voranol CP 6055 ® | 57.8 | 28.3 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 15.8 | 141.8 mmol NCO |

The test specimens (50 g/m² polyurethane PSA on 26 μm polyester film; see above) achieved a bond strength on steel of 7.0 N/cm. In the shear test a holding time of 12 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation. Removal from magazine paper was difficult, but was possible with a certain dexterity.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 5

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
| --- | --- | --- |
| A component | | |
| Voranol P 400 ® | 10.2 | 47.6 mmol OH |
| Voranol CP 4755 ® | 77.3 | 47.6 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 10.5 | 95.2 mmol NCO |

The test specimens (50 g/m² polyurethane PSA on 26 μm polyester film; see above) achieved a bond strength on steel of 2.1 N/cm. In the shear test a holding time of greater than 10,000 minutes was attained. The distance run by the ball in the Rolling Ball Test was 32 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 6

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
| --- | --- | --- |
| A component | | |
| Voranol P 400 ® | 10.4 | 48.5 mmol OH |
| Voranol CP 4755 ® | 78.7 | 48.5 mmol OH |
| Mark DBTL ® | 0.1 | |
| B component | | |
| Vestanat IPDI ® | 10.8 | 97.0 mmol NCO |

The test specimens (50 g/m² polyurethane PSA on 26 μm polyester film; see above) achieved a bond strength on steel of 2.1 N/cm. In the shear test a holding time of greater than 10,000 minutes was attained. The distance run by the ball in the Rolling Ball Test was 32 mm. After one week of irradiation with the sunlight lamp there were no changes, neither in colour nor in bond strength. After two weeks of irradiation there were no changes in colour, but the PSA was perceptibly softer. The inherent tack had increased. The bond strength was now 7.9 N/cm. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 7

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
| --- | --- | --- |
| A component | | |
| Voranol P 400 ® | 14.2 | 66.1 mmol OH |
| Voranol CP 4755 ® | 71.5 | 44.1 mmol OH |

-continued

| Ingredient | Weight fraction [% by weight] | Number of OH or NCO groups, based on the percentage weight fraction |
|---|---|---|
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 12.3 | 110.2 mmol NCO |

The test specimens (50 g/m² polyurethane PSA on 26 μm polyester film; see above) achieved a bond strength on steel of 2.6 N/cm. In the shear test a holding time of greater than 10,000 minutes was attained. The distance run by the ball in the Rolling Ball Test was 20 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 8

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Voranol P 400 ® | 20.6 | 95.9 mmol OH |
| Voranol CP 4755 ® | 62.4 | 38.4 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 15.0 | 134.3 mmol NCO |

The test specimens (50 g/m² polyurethane PSA on 26 μm polyester film; see above) achieved a bond strength on steel of 3.9 N/cm. In the shear test a holding time of 145 minutes was attained. The distance run by the ball in the Rolling Ball Test was 20 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 9

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Voranol P 400 ® | 27.8 | 129.0 mmol OH |
| Voranol CP 4755 ® | 52.3 | 32.2 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 17.9 | 161.2 mmol NCO |

The test specimens (50 g/m² polyurethane PSA on 26 μm polyester film; see above) achieved a bond strength on steel of 5.4 N/cm. In the shear test a holding time of 12 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation. Removal from magazine paper was difficult, but was possible with a certain dexterity.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 10

The composition of the inventive polyurethane PSA is as follows:
NCO/OH ratio: 1.0
Ratio of number of diol-OH/number of triol-OH: 9.0

| Ingredient | Weight fraction [% by weight] | Number of OH or NCO groups, based on the percentage weight fraction |
|---|---|---|
| A component | | |
| Voranol P 400 ® | 40.6 | 188.9 mmol OH |
| Voranol CP 4755 ® | 34.0 | 20.9 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 23.4 | 209.8 mmol NCO |

The test specimens (50 g/m² polyurethane PSA on 26 μm polyester film; see above) achieved a bond strength on steel of 7.0 N/cm. In the shear test a holding time of 10 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation. Removal from magazine paper was difficult, but was possible with a certain dexterity.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 11

The composition of the inventive polyurethane PSA is as follows:
NCO/OH ratio: 1.0
Ratio of number of diol-OH/number of triol-OH: 0.7

| Ingredient | Weight fraction [% by weight] | Number of OH or NCO groups, based on the percentage weight fraction |
|---|---|---|
| A component | | |
| Desmophen 1262 BD ® | 11.0 | 51.3 mmol OH |
| Desmophen 3061 BT ® | 73.1 | 73.1 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 13.9 | 124.4 mmol NCO |

The test specimens (50 g/m² polyurethane PSA on 26 μm polyester film; see above) achieved a bond strength on steel of 1.0 N/cm. In the shear test a holding time of greater than 10,000 minutes was attained. The distance run by the ball in the Rolling Ball Test was 33 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 12

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Desmophen 1262 BD ® | 19.7 | 91.9 mmol OH |
| Desmophen 3061 BT ® | 61.2 | 61.2 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 17.1 | 153.1 mmol NCO |

The test specimens (50 g/m² polyurethane PSA on 26 μm polyester film; see above) achieved a bond strength on steel of 1.5 N/cm. In the shear test a holding time of greater than 10,000 minutes was attained. The distance run by the ball in the Rolling Ball Test was 10 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate. This was the case even when the bonds were made on window panes and the PSA was subject to normal sunlight irradiation.

The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 13

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Desmophen 1262 BD ® | 27.3 | 127.2 mmol OH |
| Desmophen 3061 BT ® | 50.9 | 50.9 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 19.8 | 178.1 mmol NCO |

The test specimens (50 g/m$^2$ polyurethane PSA on 26 μm polyester film; see above) achieved a bond strength on steel of 3.5 N/cm. In the shear test a holding time of 2 250 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 14

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Desmophen 1262 BD ® | 34.9 | 162.8 mmol OH |
| Desmophen 3061 BT ® | 40.6 | 40.6 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 22.5 | 203.4 mmol NCO |

The test specimens (50 g/m$^2$ polyurethane PSA on 26 μm polyester film; see above) achieved a bond strength on steel of 6.1 N/cm. In the shear test a holding time of 10 minutes was attained. The distance run by the ball in the Rolling Ball Test was 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 15

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
|---|---|---|
| A component | | |
| Desmophen 1262 BD ® | 14.8 | 68.8 mmol OH |
| Desmophen 3061 BT ® | 68.8 | 68.8 mmol OH |
| Mark DBTL ® | 0.1 | |
| Tinuvin 292 ® | 0.3 | |

-continued

| Ingredient | Weight fraction [% by weight] | Number of OH or NCO groups, based on the percentage weight fraction |
|---|---|---|
| Tinuvin 400 ® | 0.6 | |
| Aerosil R202 ® | 1.0 | |
| B component | | |
| Vestanat TMDI ® | 14.5 | 137.6 mmol NCO |

The test specimens (50 g/m² polyurethane PSA on 26 µm polyester film; see above) achieved a bond strength on steel of 1.5 N/cm. In the shear test a holding time of 5 400 minutes was attained. The distance run by the ball in the Rolling Ball Test was 20 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 16

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Desmophen 1262 BD ® | 19.9 | 92.8 mmol OH |
| Desmophen 3061 BT ® | 61.8 | 61.8 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat TMDI ® | 16.3 | 154.6 mmol NCO |

The test specimens (50 g/m² polyurethane PSA on 26 µm polyester film; see above) achieved a bond strength on steel of 2.2 N/cm. In the shear test a holding time of 4 300 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 17

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Desmophen 1262 BD ® | 27.6 | 128.6 mmol OH |
| Desmophen 3061 BT ® | 51.5 | 51.5 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat TMDI ® | 18.9 | 180.1 mmol NCO |

The test specimens (50 g/m² polyurethane PSA on 26 µm polyester film; see above) achieved a bond strength on steel of 4.8 N/cm. In the shear test a holding time of 120 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 18

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Desmophen 1262 BD ® | 35.3 | 164.6 mmol OH |
| Desmophen 3061 BT ® | 41.0 | 41.0 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat TMDI ® | 21.7 | 205.6 mmol NCO |

The test specimens (50 g/m² polyurethane PSA on 26 µm polyester film; see above) achieved a bond strength on steel of 6.3 N/cm. In the shear test a holding time of 8 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. Removal from magazine paper was difficult, but was possible with a certain dexterity. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 19

The composition of the inventive polyurethane PSA is as follows:
NCO/OH ratio: 1.0
Ratio of number of diol-OH/number of triol-OH: 1.0

| Ingredient | Weight fraction [% by weight] | Number of OH and NCO groups, based on the percentage weight fraction |
|---|---|---|
| A component | | |
| Desmophen 1112 BD ® | 18.3 | 36.0 mmol OH |
| Desmophen 5031 BT ® | 71.7 | 36.0 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 8.0 | 72.0 mmol NCO |

The test specimens (50 g/m² polyurethane PSA on 26 µm polyester film; see above) achieved a bond strength on steel of 1.2 N/cm. In the shear test a holding time of 2 200 minutes was attained. The distance run by the ball in the Rolling Ball Test was 33 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 20

The composition of the inventive polyurethane PSA is as follows:
NCO/OH ratio: 1.0
Ratio of number of diol-OH/triol-OH: 1.5

| Ingredient | Weight fraction [% by weight] | Number of OH or NCO groups, based on the percentage weight fraction |
|---|---|---|
| A component | | |
| Desmophen 1112 BD ® | 24.6 | 48.6 mmol OH |
| Desmophen 5031 BT ® | 64.4 | 32.3 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 9.0 | 80.9 mmol NCO |

The test specimens (50 g/m² polyurethane PSA on 26 µm polyester film; see above) achieved a bond strength on steel of 1.8 N/cm. In the shear test a holding time of 1 450 minutes was attained. The distance run by the ball in the Rolling Ball Test was 17 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 21

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Desmophen 1112 BD ® | 34.0 | 67.2 mmol OH |
| Desmophen 5031 BT ® | 53.6 | 26.9 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 10.4 | 94.1 mmol NCO |

The test specimens (50 g/m² polyurethane PSA on 26 μm polyester film; see above) achieved a bond strength on steel of 2.3 N/cm. In the shear test a holding time of 850 minutes was attained. The distance run by the ball in the Rolling Ball Test was 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 22

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Desmophen 1112 BD ® | 43.4 | 85.6 mmol OH |
| Desmophen 5031 BT ® | 42.7 | 21.5 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 11.9 | 107.1 mmol NCO |

The test specimens (50 g/m² polyurethane PSA on 26 μm polyester film; see above) achieved a bond strength on steel of 6.9 N/cm. In the shear test a holding time of 10 minutes was attained. The distance run by the ball in the Rolling Ball Test was 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 23

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
|---|---|---|
| A component | | |
| Desmophen 1112 BD ® | 21.2 | 42.0 mmol OH |
| Desmophen 5035 BT ® | 67.4 | 42.0 mmol OH |
| Mark DBTL ® | 0.1 | |
| Tinuvin 292 ® | 0.3 | |

-continued

| Ingredient | Weight fraction [% by weight] | Number of OH or NCO groups, based on the percentage weight fraction |
|---|---|---|
| Tinuvin 400 ® | 0.6 | |
| Aerosil R202 ® | 1.0 | |
| B component | | |
| Vestanat IPDI ® | 9.4 | 84.0 mmol NCO |

The test specimens (50 g/m² polyurethane PSA on 26 μm polyester film; see above) achieved a bond strength on steel of 1.7 N/cm. In the shear test a holding time of 8 200 minutes was attained. The distance run by the ball in the Rolling Ball Test was 80 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 24

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Desmophen 1112 BD ® | 28.3 | 55.8 mmol OH |
| Desmophen 5035 BT ® | 59.4 | 37.1 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 10.3 | 92.9 mmol NCO |

The test specimens (50 g/m² polyurethane PSA on 26 μm polyester film; see above) achieved a bond strength on steel of 2.5 N/cm. In the shear test a holding time of 5 600 minutes was attained. The distance run by the ball in the Rolling Ball Test was 35 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 25

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Desmophen 1112 BD ® | 38.1 | 75.3 mmol OH |
| Desmophen 5035 BT ® | 48.3 | 30.1 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 11.6 | 105.4 mmol NCO |

The test specimens (50 g/m² polyurethane PSA on 26 μm polyester film; see above) achieved a bond strength on steel of 3.1 N/cm. In the shear test a holding time of 120 minutes was attained. The distance run by the ball in the Rolling Ball Test was 25 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 26

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Desmophen 1112 BD ® | 44.8 | 88.6 mmol OH |
| Desmophen 5035 BT ® | 40.6 | 25.3 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 12.6 | 113.9 mmol NCO |

The test specimens (50 g/m² polyurethane PSA on 26 μm polyester film; see above) achieved a bond strength on steel of 6.3 N/cm. In the shear test a holding time of 10 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 27

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
|---|---|---|
| A component | | |
| Desmophen 1112 BD ® | 28.7 | 56.7 mmol OH |
| Desmophen 3061 BT ® | 56.7 | 56.7 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 12.6 | 113.4 mmol NCO |

The test specimens (50 g/m² polyurethane PSA on 26 μm polyester film; see above) achieved a bond strength on steel of 1.5 N/cm. In the shear test a holding time of greater than 10,000 minutes was attained. The distance run by the ball in the Rolling Ball Test was 230 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 28

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Desmophen 1112 BD ® | 36.6 | 72.2 mmol OH |
| Desmophen 3061 BT ® | 48.1 | 48.1 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 13.3 | 120.3 mmol NCO |

The test specimens (50 g/m² polyurethane PSA on 26 μm polyester film; see above) achieved a bond strength on steel of 2.2 N/cm. In the shear test a holding time of greater than 10,000 minutes was attained. The distance run by the ball in the Rolling Ball Test was 90 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 29

The composition of the inventive polyurethane PSA is as follows:
NCO/OH ratio: 1.0
Ratio of number of diol-OH/number of triol-OH: 2.5

| Ingredient | Weight fraction [% by weight] | Number of OH or NCO groups, based on the percentage weight fraction |
|---|---|---|
| A component | | |
| Desmophen 1112 BD ® | 46.7 | 92.4 mmol OH |
| Desmophen 3061 BT ® | 37.0 | 37.0 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 14.3 | 129.4 mmol NCO |

The test specimens (50 g/m$^2$ polyurethane PSA on 26 μm polyester film; see above) achieved a bond strength on steel of 3.4 N/cm. In the shear test a holding time of 890 minutes was attained. The distance run by the ball in the Rolling Ball Test was 35 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 30

The composition of the inventive polyurethane PSA is as follows:
NCO/OH ratio: 1.0
Ratio of number of diol-OH/number of triol-OH: 4.0

| Ingredient | Weight fraction [% by weight] | Number of OH or NCO groups, based on the percentage weight fraction |
|---|---|---|
| A component | | |
| Desmophen 1112 BD ® | 55.4 | 109.4 mmol OH |
| Desmophen 3061 BT ® | 27.4 | 27.4 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 15.2 | 136.8 mmol NCO |

The test specimens (50 g/m$^2$ polyurethane PSA on 26 μm polyester film; see above) achieved a bond strength on steel of 5.2 N/cm. In the shear test a holding time of 10 minutes was attained. The distance run by the ball in the Rolling Ball Test was 15 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 31

The composition of the inventive polyurethane PSA is as follows:
NCO/OH ratio: 1.0
Ratio of number of diol-OH/number of triol-OH: 0.7

| Ingredient | Weight fraction [% by weight] | Number of OH or NCO groups, based on the percentage weight fraction |
|---|---|---|
| A component | | |
| Acclaim 2220 N ® | 68.8 | 61.2 mmol OH |
| Desmophen 1380 BT ® | 12.7 | 87.3 mmol OH |
| Mark DBTL ® | 0.1 | |
| Tinuvin 292 ® | 0.3 | |

-continued

| Ingredient | Weight fraction [% by weight] | Number of OH or NCO groups, based on the percentage weight fraction |
|---|---|---|
| Tinuvin 400 ® | 0.6 | |
| Aerosil R202 ® | 1.0 | |
| B component | | |
| Vestanat IPDI ® | 16.5 | 148.5 mmol NCO |

The test specimens (50 g/m² polyurethane PSA on 26 μm polyester film; see above) achieved a bond strength on steel of 3.4 N/cm. In the shear test a holding time of greater than 10,000 minutes was attained. The distance run by the ball in the Rolling Ball Test was 20 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 32

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
|---|---|---|
| A component | | |
| Acclaim 2220 N ® | 73.7 | 65.6 mmol OH |
| Desmophen 1380 BT ® | 9.6 | 65.6 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 14.7 | 131.2 mmol NCO |

The test specimens (50 g/m² polyurethane PSA on 26 μm polyester film; see above) achieved a bond strength on steel of 4.8 N/cm. In the shear test a holding time of 90 minutes was attained. The distance run by the ball in the Rolling Ball Test was 10 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 33

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Acclaim 2220 N ® | 78.1 | 69.5 mmol OH |
| Desmophen 1380 BT ® | 7.0 | 46.5 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 12.9 | 116.0 mmol NCO |

The test specimens (50 g/m² polyurethane PSA on 26 μm polyester film; see above) achieved a bond strength on steel of 5.6 N/cm. In the shear test a holding time of 10 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 34

The composition of the inventive polyurethane PSA is as follows:
NCO/OH ratio: 1.0
Ratio of number of diol-OH/number of triol-OH: 0.7

| Ingredient | Weight fraction [% by weight] | Number of OH or NCO groups, based on the percentage weight fraction |
|---|---|---|
| A component | | |
| Acclaim 4220 N ® | 79.0 | 39.5 mmol OH |
| Baycoll 1380 BT ® | 8.3 | 56.5 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 10.7 | 96.0 mmol NCO |

The test specimens (50 g/m² polyurethane PSA on 26 µm polyester film; see above) achieved a bond strength on steel of 3.8 N/cm. In the shear test a holding time of 6 400 minutes was attained. The distance run by the ball in the Rolling Ball Test was 35 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 35

The composition of the inventive polyurethane PSA is as follows:
NCO/OH ratio: 1.0
Ratio of number of diol-OH/number of triol-OH: 1.0

| Ingredient | Weight fraction [% by weight] | Number of OH or NCO groups, based on the percentage weight fraction |
|---|---|---|
| A component | | |
| Acclaim 4220 N ® | 82.7 | 41.4 mmol OH |
| Desmophen 1380 BT ® | 6.2 | 41.4 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 9.1 | 82.8 mmol NCO |

The test specimens (50 g/m² polyurethane PSA on 26 µm polyester film; see above) achieved a bond strength on steel of 4.3 N/cm. In the shear test a holding time of 100 minutes was attained. The distance run by the ball in the Rolling Ball Test was 15 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

Example 36

The composition of the inventive polyurethane PSA is as follows:
NCO/OH ratio: 1.0
Ratio of number of diol-OH/number of triol-OH: 1.5

| Ingredient | Weight fraction [% by weight] | Number of OH or NCO groups, based on the percentage weight fraction |
|---|---|---|
| A component | | |
| Acclaim 4220 N ® | 85.6 | 42.8 mmol OH |
| Desmophen 1380 BT ® | 4.3 | 28.7 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 8.1 | 71.5 mmol NCO |

The test specimens (50 g/m² polyurethane PSA on 26 µm polyester film; see above) achieved a bond strength on steel of 5.6 N/cm. In the shear test a holding time of 10 minutes was attained. The distance run by the ball in the Rolling Ball Test was less than 5 mm. After two weeks of irradiation with the sunlight lamp there were no changes, neither in colour nor in bond strength. The PSA allowed various types of paper (normal writing paper, copier paper, newsprint and magazine paper) and paperboard to be reliably bonded. The PSA was in each case removable again without problems even after a bonding time of six months, without leaving behind residues or greasy-looking spots and without damaging the substrate.

This was the case even when the bonds were made on window panes and the PSA was subject to normal sunlight irradiation. The PSA was washable. For testing it was sprinkled with fine-grained sand and, in a second test, with fine-grained talc. Both substances were easily removable again under running water. The bond strength was subsequently at the original level again. Repeat usability was tested by adhering a test specimen to writing paper and detaching it again 20 times in succession. The bond strength thereafter was still at the original level.

COMPARATIVE EXAMPLES

Comparative Example 1

Polyurethane Composition:
NCO/OH ratio: 0.7
Ratio of number of diol-OH/number of triol-OH: 1.5

| Ingredient | Weight fraction [% by weight] | Number of OH or NCO groups, based on the percentage weight fraction |
|---|---|---|
| A component | | |
| Voranol P 400 ® | 12.5 | 57.6 mmol OH |
| Voranol CP 6055 ® | 78.2 | 38.4 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 7.4 | 67.2 mmol NCO |

The test specimens (50 g/m² polyurethane PSA on 26 µm polyester film; see above) achieved a bond strength on steel of 2.4 N/cm. In the shear test a holding time of 5 minutes was achieved. The distance travelled by the ball in the Rolling Ball Test was 5 mm.

The PSA was adhered to different kinds of paper. After just one day it left greasy-looking spots on the papers.

Comparative Example 2

Polyurethane Composition:
NCO/OH ratio: 1.0
Ratio of number of diol-OH/number of triol-OH: 12.0

| Ingredient | Weight fraction [% by weight] | Number of OH or NCO groups, based on the percentage weight fraction |
|---|---|---|
| A component | | |
| Desmophen 1262 BD ® | 42.0 | 195.6 mmol OH |
| Desmophen 5031 BT ® | 32.5 | 16.4 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 23.5 | 212.0 mmol NCO |

The test specimens (50 g/m² polyurethane PSA on 26 µm polyester film; see above) achieved a bond strength on steel of 2.1 N/cm. In the shear test a holding time of less than 5 minutes was achieved. The distance travelled by the ball in the Rolling Ball Test was less than 5 mm.

The PSA was adhered to different kinds of paper. After just one day it left greasy-looking spots on the papers.

Comparative Example 3

Polyurethane Composition:
NCO/OH ratio: 1.0
Ratio of number of diol-OH/number of triol-OH: 0.1

| Ingredient | Weight fraction [% by weight] | Number of OH or NCO groups, based on the percentage weight fraction |
|---|---|---|
| A component | | |
| Acclaim 2200 N ® | 28.8 | 25.6 mmol OH |
| Desmophen 1380 BT ® | 37.8 | 256.0 mmol OH |
| Mark DBTL ® | 0.1 | |
| Tinuvin 292 ® | 0.3 | |
| Tinuvin 400 ® | 0.6 | |
| Aerosil R202 ® | 1.0 | |
| B component | | |
| Vestanat IPDI ® | 31.4 | 281.6 mmol NCO |

The test specimens (50 g/m² polyurethane PSA on 26 µm polyester film; see above) achieved a bond strength on steel of less than 0.1 N/cm. In the shear test a holding time of less than 5 minutes was achieved. The distance travelled by the ball in the Rolling Ball Test was greater than 300 mm. The bond strength was too low to fix paper, paperboard or other lightweight articles reliably.

We claim:
1. Pressure-sensitive adhesive comprising the reaction product of:
   a) at least one aliphatic or alicyclic diisocyanate having an asymmetrical molecular structure,
   b) a combination of at least one polypropylene glycol diol and at least one polypropylene glycol triol,
      the ratio of the number of hydroxyl groups in the diol component to the number of hydroxyl groups in the triol component being between 1.0 and 9.0;
      the ratio of the number of isocyanate groups to the total number of hydroxyl groups being between 0.9 and 1.1, and the diols end triols alternatively being selected and combined in each case as follows:

diols having a molecular weight of less than or equal to 1000 are combined with triols whose molecular weight is greater than 1000, diols having a molecular weight of greater than 1000 are combined with triols whose molecular weight is less than 1000.

2. Pressure-sensitive adhesive according to claim 1, wherein said at least one aliphatic or alicyclic diisocyanate is selected from the group consisting of 1-isocyanatomethyl-3-isocyanato-1,5,5-trimethylcyclohexane (isophorone diisocyanate), 1-methyl-2,4-diisocyanatocyclohexane, 1, 6-diisocyanato-2,2,4-trimethylhexane, 1,6-diisocyanato-2,4,4-trimethylhexane, 5-isocyanato-1-(2-isocyanatoeth-1-yl)-1,3,3-trimethylcyclohexane, 5-isocyanato-1-(3-isocyanatoprop-1-yl)-1,3,3-trimethylcyclohexane, 5-lsocyanato-1-(4-isocyanatobut-1-yl)-1,3,3-trimethylcyclohexane, 1-isocyanato-2-(3-isocyanatoprop-1-yl)cyctohexane, 1-isocyanato-2-(2-isocyanatoeth-1-yl)cyclohexane, dicyclohexylmethane 2,4'-diisocyanate, 2-heptyl-3,4-bis(9-isocyanatononyl)-1-pentylcyclohexane, ethylethylene diisocyanate, 2,2, 4-trimethylhexamethylene diisocyanate chlorinated diisocyanates having an asymmetrical molecular structure, brominated diisocyanates having an asymmetrical molecular structure, sulphur-containing diisocyanates having an asymmetrical molecular structure and phosphorus-containing diisocyanates having an asymmetrical molecular structure.

3. Pressure-sensitive adhesive according to claim 1 further comprising formulating ingredients selected from the group consisting of catalysts, ageing inhibitors (antioxidants), light stabilizers, UV absorbers and rheological additives.

4. Process for preparing the pressure-sensitive adhesive of claim 1, comprising a) charging a first vessel A with a premixed combination of at least one polypropylene glycol diol and at least one polypropylene glycol trial and charging a second vessel B with at least one aliphatic or alicyclic diisocyanate, optionally also charging said first or second vessel, or both of said vessels, with one or more formulating ingredients selected from the group consisting of catalysts, ageing inhibitors (antioxidants), light stabilizers, UV absorbers and rheological additives, b) conveying the polyol component and the isocyanate component from said vessels via pumps through a mixing head or mixing tube of a multi-component mixing and metering unit, and mixing them to form a reactive polyurethane composition, c) applying the reactive polyurethane composition to a web-form backing material, d) passing the backing material with the reactive polyurethane composition thereon through a heating tunnel in which the reactive polyurethane composition cures to form a pressure-sensitive adhesive, and e) winding the backing material with the pressure-sensitive adhesive thereon up in a winding station.

5. Process according to claim 4, wherein the preparation takes place without solvent.

6. Process according to claim 4, wherein the preparation takes place without addition of water.

7. A self-adhesive article comprising the pressure-sensitive adhesive of claim 1.

8. A method for fixing notes, sheets of paper, calendar pages, strips, cards or boxes made of paperboard, cardboard or plastic, or small utility articles made of plastic, wood, glass, stone or metal, which comprises fixing same with the pressure-sensitive adhesive of claim 1.

9. Pressure sensitive adhesive according to claim 1, wherein said ratio of the number of hydroxyl groups in the diol component to the number of hydroxyl groups in the triol component is between 1.5 and 2.5.

10. Pressure sensitive adhesive according to claim 1, wherein said ratio of the number of isocyanate groups to the total number of hydroxyl groups is between 095 and 1.05.

11. Pressure sensitive adhesive according to claim 1, wherein the molecular weight of said trials which are combined with dials having a molecular weight of less than or equal to 1000 is greater than 3000.

12. The process of claim 4, wherein said web-from backing material is moving at a constant speed while said reactive polyurethane composition is applied thereto.

* * * * *